United States Patent [19]

Swartz et al.

[11] 4,270,077

[45] May 26, 1981

[54] DEMODULATORLESS SYNCHRO POSITION SENSOR APPARATUS UTILIZING SQUARE WAVE EXCITATION

[75] Inventors: Harold L. Swartz, Glendale; Joseph M. Buemi, Jr., Phoenix, both of Ariz.

[73] Assignee: Sperry Corporation, New York, N.Y.

[21] Appl. No.: 129,133

[22] Filed: Mar. 10, 1980

[51] Int. Cl.³ .............................................. G05B 1/06
[52] U.S. Cl. ................................... 318/661; 318/636; 340/347 SY; 329/50
[58] Field of Search ............... 318/605, 661, 654, 562, 318/636; 340/347 SY; 329/50; 328/151

[56] References Cited

U.S. PATENT DOCUMENTS

| | | | |
|---|---|---|---|
| 3,710,223 | 1/1973 | Cottrell | 318/654 |
| 3,990,062 | 11/1976 | Miller et al. | 340/347 SY |
| 4,031,479 | 6/1977 | Thomas, Jr. et al. | 318/661 X |
| 4,095,159 | 6/1978 | Tirelli | 318/661 X |
| 4,160,245 | 6/1979 | Scott | 340/347 SY |

Primary Examiner—B. Dobeck
Attorney, Agent, or Firm—Howard P. Terry; Albert B. Cooper

[57] ABSTRACT

A synchro resolver angular position sensor provides the sine and cosine of angular position by applying a square wave excitation to the resolver stator winding. The corresponding square wave outputs of the sine and cosine windings of the resolver rotor are sampled in time synchronism with the excitation at a predetermined time phase of the square wave excitation cycle. The sampled sine and cosine amplitudes are converted into digital format via an analog-to-digital converter for application to a digital processor. The upper corners of the positively-going leading edges and the lower corners of the negatively-going leading edges of the square wave excitation waveform are rounded to minimize ringing of the sine and cosine square wave outputs from the resolver.

15 Claims, 5 Drawing Figures

$CST = (20KHz \oplus 10KHz) \cdot CLEN \cdot 5KHz \cdot \overline{40KHz}$

DEMODULATORLESS SYNCHRO POSITION SENSOR APPARATUS UTILIZING SQUARE WAVE EXCITATION

BACKGROUND OF THE INVENTION

1. Field of the Invention

The invention relates generally to synchro devices and particularly to synchro devices wherein the synchro outputs normally require demodulation.

2. Description of the Prior Art

Synchro devices such as synchro resolvers are utilized in numerous applications for providing a measure of angular position. For example, synchro resolvers are utilized to provide an angular position feedback signal in closed loop positioning servoes. In such an application, the resolver rotor may be coupled to the element being positioned by the servo and a sinusoidal voltage, typically having a frequency of 400 Hz, applied, for example, to the resolver stator windings. The sinusoidal excitation voltage is coupled from the stator windings to the rotor output windings to provide sinusoidal output signals having respective amplitudes proportional to the sine and cosine of the angle at which the rotor is positioned. The output voltages are either in-phase or out-of-phase with the excitation voltage depending upon the angular position of the resolver rotor.

In conventional arrangements, the resolver output voltages are converted to d.c. signals of amplitude proportional to the respective sine and cosine values and of polarity in accordance with whether the output voltage is in-phase or out-of-phase with the excitation signal. Synchronous demodulators are typically utilized to perform the conversion between the sinusoidal synchro output voltages and the corresponding d.c. levels. The d.c. signals so provided may be converted into digital format by an analog-to-digital converter for numerical processing in systems utilizing a digital processor. The d.c. signals provided from the demodulators or the digitally converted versions thereof may be utilized to provide feedback signals for the closed loop servo in which the synchro resolver is utilized.

Demodulators of the type utilized with synchro devices tend to be complex, bulky and expensive and in addition require an undesired dissipation of power.

Aircraft flight instruments typically utilize a plurality of closed loop servo mechanisms to position various elements of the instrument. Each such servo mechanism may conveniently utilize a synchro resolver to provide the position feedback signal therefor. Since, in the prior art, each resolver of the type described above requires two demodulators, a considerable number of demodulators are required in such instruments. Since a decrease in power dissipation, volume, weight, complexity as well as cost is especially desirable in aircraft flight instruments, it is particularly undesirable in such an environment to utilize large numbers of demodulators.

It is a desideratum of the present invention to eliminate the requirement for demodulators in applications such as those described above.

SUMMARY OF THE INVENTION

The output of a synchro device is effectively demodulated without the use of demodulators by applying a square wave excitation signal to either the stator windings or rotor windings of the synchro device and sampling the square wave output signal from the other windings of the synchro device at a predetermined time phase of the excitation signal cycle. The sampled output signals provide the effectively demodulated synchro device output. Preferably, the leading edges of the square wave excitation signal are rounded to minimize ringing on the square wave output signals.

DESCRIPTION OF THE PREFERRED EMBODIMENT

Figure 1:
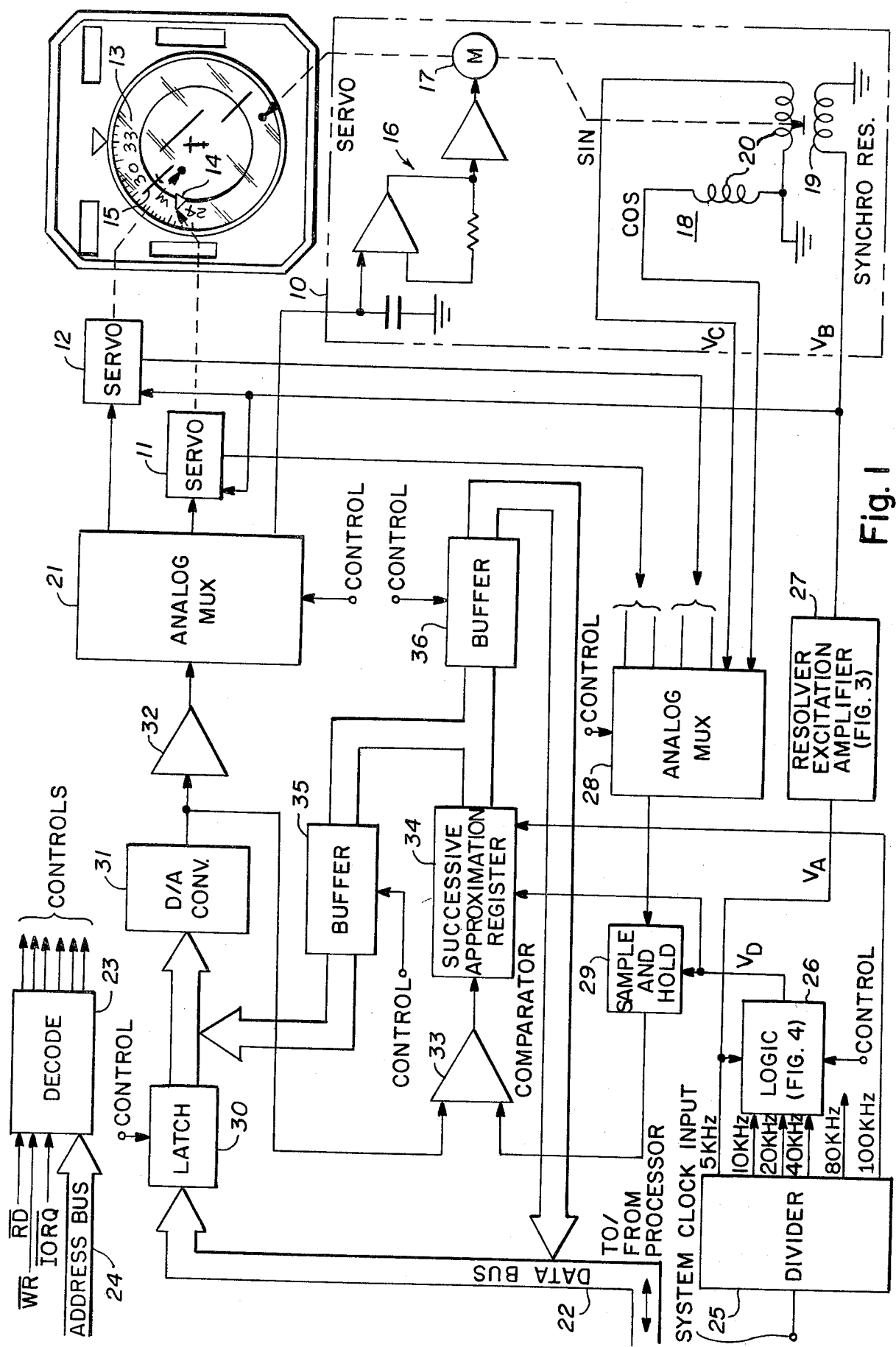
FIG. 1 is a schematic block diagram of a portion of a Horizontal Situation Indicator (HSI) flight instrument incorporating the present invention.

Referring to FIG. 1, a schematic block diagram of a portion of an HSI flight instrument incorporating the present invention is illustrated. The portion of the HSI depicted in FIG. 1 includes three identical servoes 10, 11 and 12 for positioning the compass card 13, the heading select pointer 14 and the course select pointer 15, respectively, of the instrument. The servo 10, for example, includes a servo amplifier 16 driving a servo motor 17 which, in turn, positions the compass card 13 via suitable mechanical coupling. A synchro resolver 18 is coupled to the output of the servo motor 17 to provide angular positional feedback data for the servo 10, the feedback data representing the angular position of the compass card 13. The synchro resolver 18 is comprised of a rotor winding 19 and stator windings 20, the rotor windings being mechanically coupled to the output of the servo motor 17 through suitable gearing. The two windings of the stator 20 provide signals proportional to the sine and cosine, respectively, of the rotor angle in a manner to be described in accordance with the present invention. An excitation voltage $V_B$ is applied to the rotor winding 19 in accordance with the invention so as to enable the apparatus of the invention to derive the sine and cosine data from the windings of the stator 20 without utilizing demodulators in a manner to be explained.

The servo amplifier 16 receives an analog servo error signal from an analog multiplexer 21 for driving the servo 10. The servo motor 17 positions the compass card 13 and the feedback resolver 18 until the error signal goes to null.

It will be appreciated that the servo 10 illustrates only the positioning and feedback portion of the closed loop servo mechanism for positioning the compass card 13. The source of positional command as well as the servo error signal generator, which complete the closed servo loop are not shown in FIG. 1 but will be generally described later for completeness.

The HSI instrument situs in which the present invention is incorporated includes a digital microprocessor (not shown) that provides digital data words to the instrument wherein they are converted into analog format for use therein. Analog signals within the instrument are converted into digital format for application to the microprocessor wherein data processing functions are performed thereon. Digital data is transferred to and from the processor via a data bus 22. A decode circuit 23 is also included to provide discrete control signals to the components of the instrument in response to system control signals and signals from the processor. A READ signal ($\overline{RD}$), a WRITE signal ($\overline{WR}$) and an INPUT/OUTPUT REQUEST signal ($\overline{IORQ}$) as well as the processor address bus 24 are applied to the decode circuit 23 to generate the control discrete signals to be described.

Figure 2:
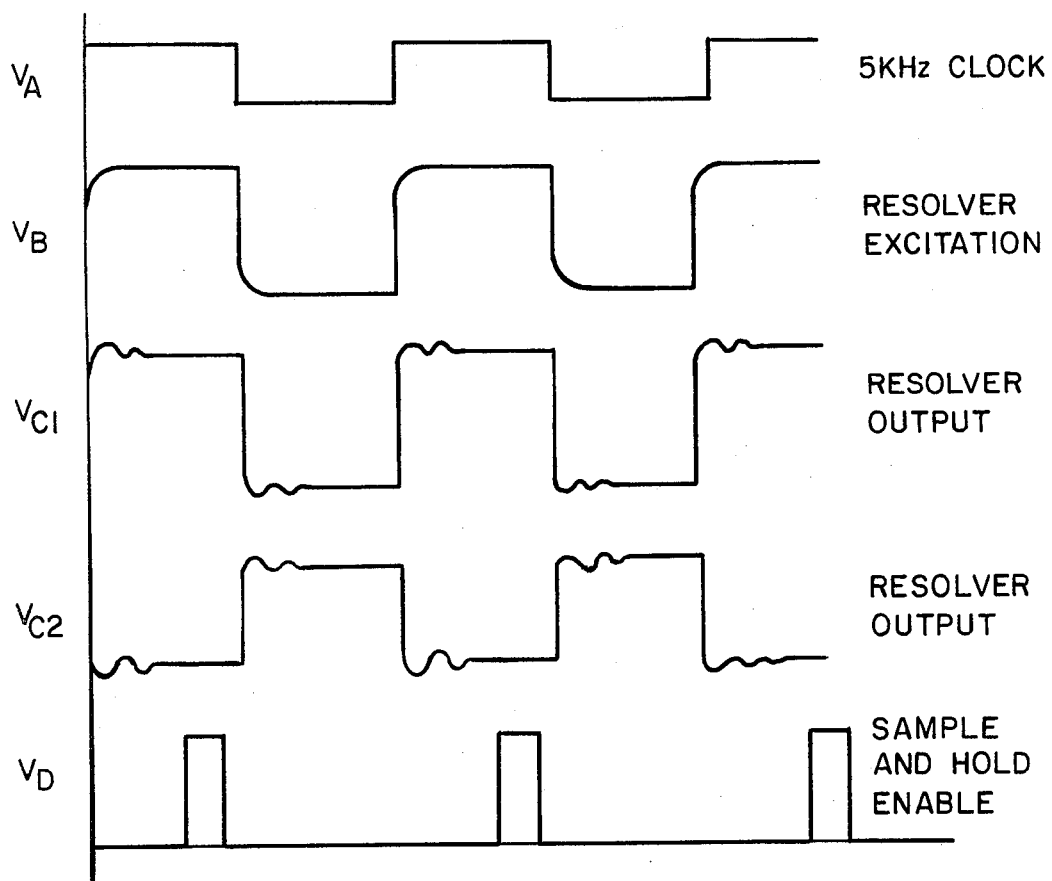
FIG. 2 is a waveform timing diagram illustrating waveforms at various points of FIG. 1.
Figure 4:
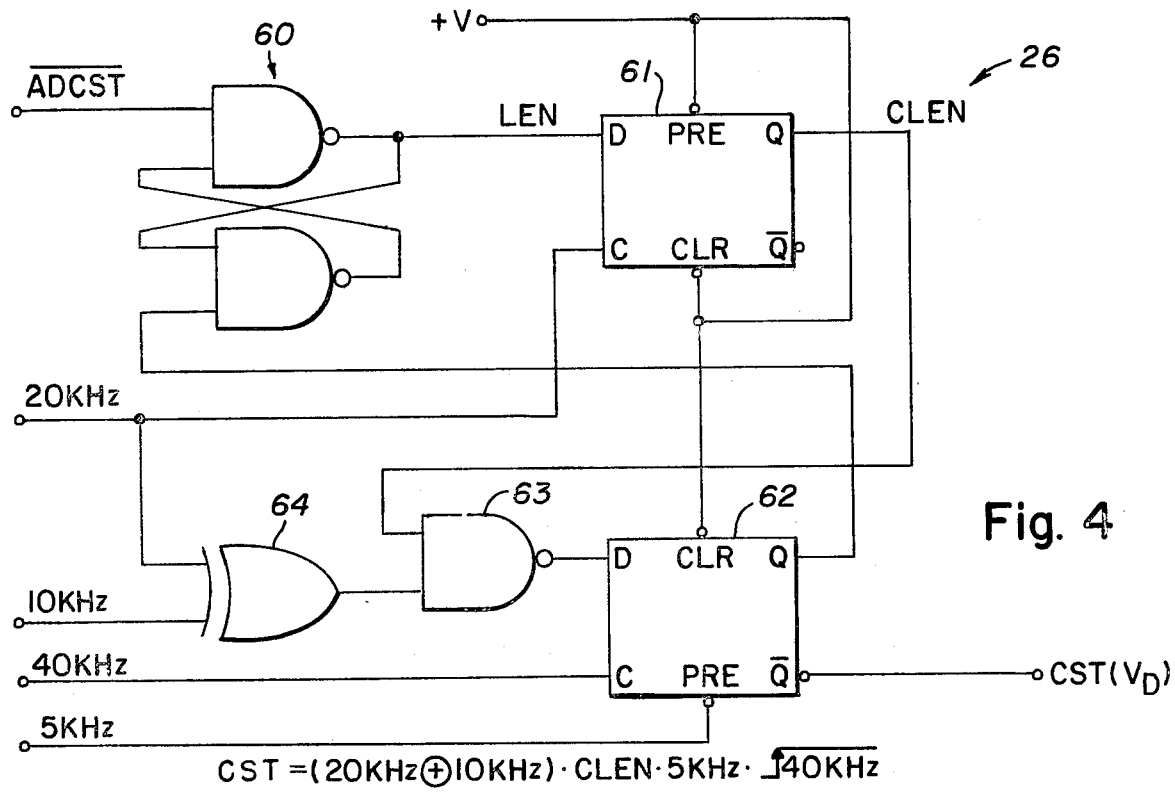
FIG. 4 is a schematic logic diagram of the logic block of FIG. 1.
Figure 5:
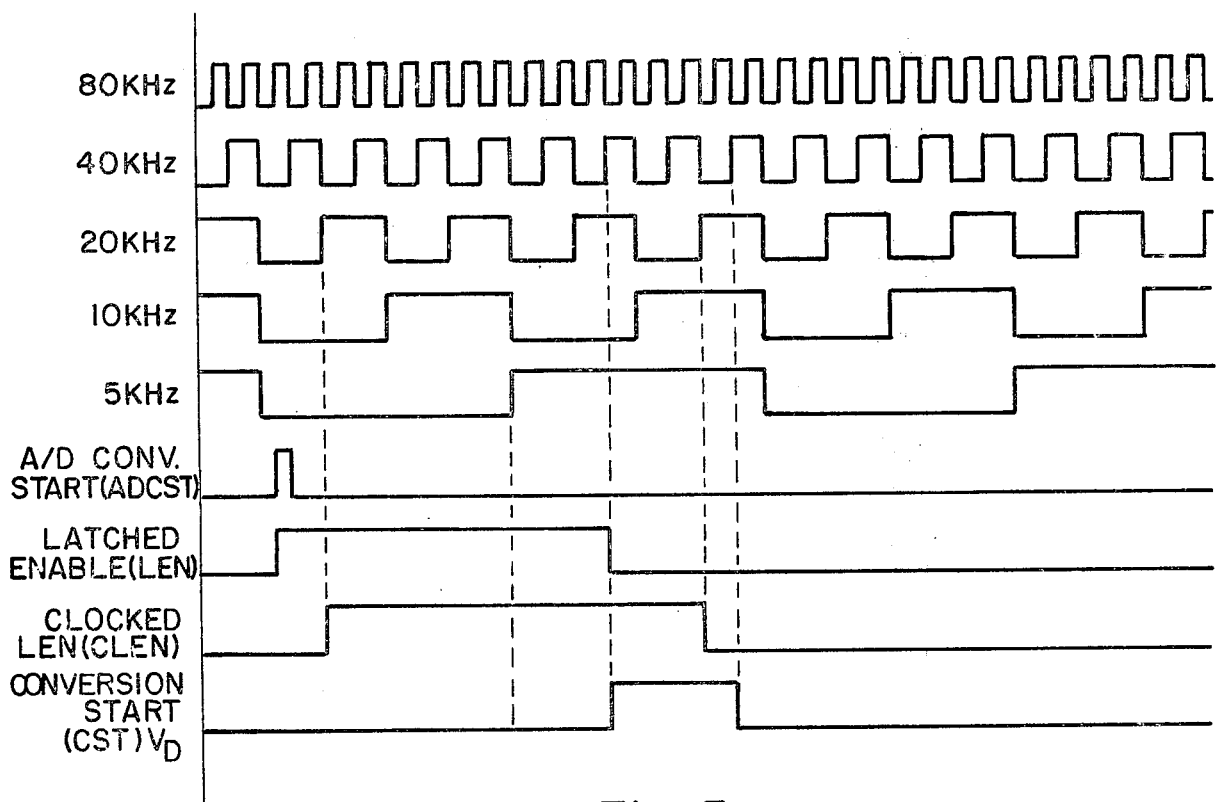
FIG. 5 is a waveform timing diagram illustrating waveforms at various points of FIGS. 1 and 4.

A system clock signal is applied to a frequency divider 25 for providing timing signals at nominal frequencies of 5, 10, 20, 40, 80 and 100 KHz, as illustrated in FIG. 5. The 5 KHz square wave signal is utilized to provide the excitation voltage for the resolver 18, the 5 KHz from the divider 25 being designated as $V_A$ as indicated in FIG. 2. The 5, 10, 20 and 40 KHz signals are applied to logic circuit 26 for generating a sampling pulse $V_D$ in time phase synchronism with the 5 KHz excitation voltage $V_A$. The time relationship of the sampling pulse $V_D$ is illustrated in FIGS. 2 and 5. The detailed structure and operation of the logic circuit 26 will be hereinbelow described with respect to FIGS. 4 and 5.

As observed in FIGS. 2 and 5, the 5 KHz signal $V_A$ is a square wave signal varying between 0 volts and a positive potential. The excitation voltage for application to the resolver 18 should, however, comprise a signal having a d.c. level of 0 volts and varying symmetrically positive and negative with respect to the 0 volt level. Additionally, if the square wave signal $V_A$ were applied directly to the resolver 18, excessive ringing would occur in the output square wave signals from the resolver 18 rendering accurate voltage measurement difficult. Accordingly, the 5 KHz square wave signal $V_A$ is applied to the synchro resolver 18 through a resolver excitation amplifier 27 which shifts the d.c. level of the $V_A$ voltage to ground potential and, in addition, rounds the upper corners of the positive going leading edges and the lower corners of the negative going leading edges of the waveform $V_A$ to minimize the ringing of the synchro resolver output waveforms $V_C$. The shaped and level shifted output of the resolver excitation amplifier 27 is designated as $V_B$ and is illustrated in FIG. 2. Details of the structure and operation of the resolver excitation amplifier 27 will be hereinbelow described with respect to FIGS. 2 and 3.

With the excitation signal $V_B$ applied to the rotor 19 of the resolver 18, the sine and cosine windings of the rotor 20 provide square wave outputs $V_C$ having amplitudes in accordance with the rotor angular position and being either in-phase or out-of-phase with the excitation $V_B$ in accordance with the rotor angular position. The sine and cosine output voltages are designated as $V_{C1}$ and $V_{C2}$ as illustrated in FIG. 2 for an arbitrary rotor position. It is appreciated in accordance with resolver operation that the amplitude of the sine output from the resolver 20 will vary sinusoidally as a function of rotor angular position and will be in-phase with the excitation signal $V_B$ for positive values of the sine and out-of-phase with the excitation signal $V_B$ for negative values of the sine. Similarly, the amplitude of the cosine output of the resolver 20 varies cosinusoidally as a function of the rotor angular position and is similarly in-phase with the excitation signal $V_B$ for positive values of the cosine and out-of-phase with the excitation signal $V_B$ for negative values of the cosine. It is appreciated that the shaped excitation signal $V_B$ is applied to the servoes 11 and 12 in the same manner as that described with respect to the servo 10.

The sine and cosine output signals $V_C$ of the resolver 18 are applied as inputs to an analog multiplexer 28 whose output is applied to a sample and hold circuit 29. The $V_D$ sampling pulse from the logic 26 is applied to the sample and hold circuit 29 to enable the sampling of the input waveform applied thereto. As illustrated in FIG. 2, the pulse $V_D$ samples the resolver output waveforms on the flat stable portions thereof at a predetermined time phase with respect to the 5 KHz resolver excitation signal $V_A$. It is appreciated from the waveforms of FIG. 2 that when the analog multiplexer 28 applies the sine resolver output to the sample and hold circuit 29, the output of the sample and hold circuit 29 will provide a d.c. voltage of amplitude and sign in accordance with the amplitude and sign of the sine of the resolver rotor angle. Similarly, when the cosine resolver output is applied to the sample and hold circuit 29, the output thereof is a d.c. voltage of amplitude and sign in accordance with the amplitude and sign of the cosine of the resolver rotor angle. These are the voltage levels that would normally be provided by synchronously demodulating the resolver output signals resulting from application to the resolver 20 of the conventional 400 Hz sinusoidal excitation signal. These effectively demodulated signals from the sample and hold circuit 29 are provided, however, without the use of the undesirable demodulators conventionally required.

In the microprocessor controlled HSI situs for the invention illustrated in FIG. 1, it is desirable to convert the analog levels provided by the sample and hold circuit 29 into digital format for transmission to the microprocessor (not shown) via the data bus 22. Any conventional analog-to-digital converter may be so utilized for this purpose. In the HSI of FIG. 1, a conventional successive approximation analog-to-digital converter arrangement to be described is utilized.

In the microprocessor controlled HSI of FIG. 1, the servoes 10, 11 and 12 may be considered as input/output devices connected as a data port of the microprocessor via the data bus 22. The sine and cosine square wave outputs from each of the synchro resolvers in the servoes 10, 11 and 12 are applied via the multiplexer 28 to the sample and hold circuit 29, the output of which being converted to digital format for input to the microprocessor via the data bus 22. The microprocessor, in a manner to be explained, outputs to the servoes 10, 11 and 12 servo error signals for positioning the output members associated with each servo. The servo error signal is provided from the microprocessor via the data bus 22 in digital format and applied to a parallel latch 30. The parallel digital output of the latch 30 is applied to a conventional digital-to-analog converter 31 whose output in turn provides the input to the analog multiplexer 21 via an amplifier 32. As explained above, the outputs of the analog multiplexer 21 provide the analog error signals to the respective servoes 10, 11 and 12.

The digital-to-analog converter 31 is utilized to output data from the microprocessor to the servoes. An analog-to-digital converter configuration which includes the digital-to-analog converter 31 is utilized to input data from the servoes to the processor. Essentially, the analog-to-digital converter comprises a comparator 33, a successive approximation register 34 and the digital-to-analog converter 31. The successive approximation register 34, which is a commercially procurable integrated circuit, stores a parallel digital word which through a successive approximation procedure is controlled to form the digital equivalent of the analog signal from the sample and hold circuit 29. The parallel digital word in the register 34 is applied via a parallel buffer 35 as an input to the digital-to-analog converter 31. When the system is inputting data from the servoes to the processor, an analog-to-digital conversion is performed and the digital-to-analog converter 31 receives its input from the buffer 35. When, however, the processor is outputting data to the servoes and a digital-to-analog conversion is required, the digital-to-analog converter 31 receives its input from the latch 30.

In the analog-to-digital conversion arrangement illustrated in FIG. 1, the analog output from the sample and hold circuit 29 to be converted is applied as an input to the comparator 33 which receives its second input from the output of the digital-to-analog converter 31. The output of the comparator 33 is applied to the successive approximation register 34 wherein it controls the digits of the digital word stored therein until the output from the digital-to-analog converter 31 is equal to the analog sample from the sample and hold circuit 29.

The register 34 is reset by the 100 KHz clock when $V_D$ is low. The reset state of the register 34 causes the output of digital-to-analog converter 31 to be $\phi$ volts for the initial approximation. Once $V_D$ is returned high the output of the sample and hold 29 is fixed and the conversion is begun. The 100 KHz timing clock causes each bit of register 34 to set or reset as dictated by comparator 33. The resulting digital word applied to the digital-to-analog converter 31 via the buffer 35 results in a corresponding analog input to the comparator 33 wherein this value is compared to the output from the sample and hold circuit 29. If the output from the converter 31 is greater than the analog sample from the sample and hold circuit 29, the comparator 33 resets the current bit of the register 34 back to 1. If, however, the digital-to-analog converter 31 provides a voltage that is less than the analog signal from the sample and hold circuit 29, the current bit remains set in the 0 state. This procedure is repeated for the remaining bits of the word in order of decreasing significance whereby, after the least significant bit is tested in this manner, the digital word in the register 34 results in the output of the converter 31 being equal to the analog signal from the sample and hold circuit 29. The digital word in the register 34 is, therefore, the digital equivalent of the analog signal from the sample and hold circuit 29. After the conversion is performed, the digital word from the register 34 is inputted into the processor via a parallel buffer 36.

As discussed above, the servo 10 provides the positioning and feedback elements of a closed loop servo mechanism for positioning the compass card 13. The servo loop is closed through the processor as follows. An angular positioning command is received from external apparatus (not shown) and applied to the processor after appropriate analog-to-digital conversion. The sine and cosine signals from the resolver 18 are converted into digital format as described above and applied to the processor via the data bus 22. The processor converts the sine and cosine signals to the equivalent angle and compares this angle data with the commanded angular position to provide an error signal proportional to the difference therebetween. The digital error signal from the processor is converted via the digital-to-analog converter 31 into an analog error signal and applied via the analog multiplexer 21 to the servo amplifier 16 so as to drive the servo motor 17 until the error signal detected by the processor is reduced to null.

Figure 3:
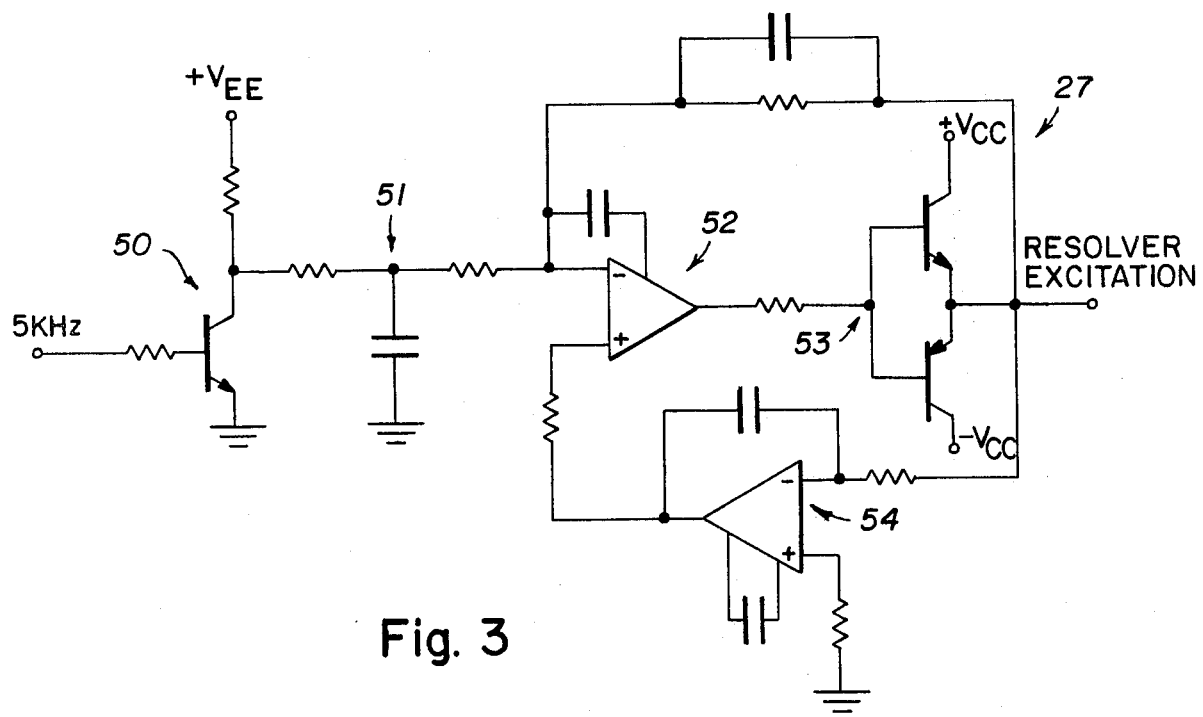
FIG. 3 is a schematic circuit diagram of the resolver excitation amplifier of FIG. 1.

Referring now to FIG. 3 considered in conjunction with FIG. 2, details of the resolver excitation amplifier 27 of FIG. 1, as well as input and output waveforms thereof, are illustrated. The 5 KHz clock $V_A$ (FIG. 2) is applied to a transistor switching circuit 50 which provides a 5 KHz square wave varying between ground potential and $+V_{EE}$. The output of the switching circuit 50 is applied to an R-C filter circuit 51 for rounding the corners of the leading edges of the 5 KHz square wave so as to minimize ringing on the resolver output signals. Specifically, the circuit 51 rounds the upper corners of the positive-going leading edges and the lower corners of the negative-going leading edges of the square wave signal. The shaped square wave from the filter 51 is applied through an operational amplifier circuit 52 to a push-pull transistor power driver circuit 53 which provides the excitation voltage to the resolvers of the system. The output of the driver circuit 53 is applied as an input to an operational amplifier integrator 54 whose output is applied as an input to the operational amplifier circuit 52. The integrator 54 functions to remove any d.c. component from the output waveform causing the output waveform to vary symmetrically about zero potential. The resolver excitation output waveform, $V_B$, provided by the circuit of FIG. 3 is illustrated in FIG. 2.

Referring now to FIGS. 4 and 5, details of the logic block 26 of FIG. 1 and timing waveforms associated therewith are illustrated. The logic 26 controls the sample time at which the sample pulse $V_D$ (FIGS. 2 and 5) is generated. As explained above, the sample time is synchronized with respect to the resolver excitation signal $V_B$ as illustrated in FIG. 2. As discussed above with respect to FIG. 1, the logic 26 receives the four synchronized clock signals 5 KHz, 10 KHz, 20 KHz and 40 KHz as illustrated in FIG. 5. When an analog-to-digital conversion is requested by the microprocessor, the decode circuit 23 (FIG. 1) generates an A/D Conversion Start (ADCST) pulse as illustrated in FIG. 5. The ADCST line is applied to a latch 60 which in response thereto is set to provide a latched enable signal (LEN) as illustrated in FIG. 5, which signal enables the sample time control logic 26. The LEN signal from the latch 60 is applied to the D input of an edge triggered D type flip-flop 61 which receives the 20 KHz synchronized clock signal as its clock input. Since the preset and clear inputs of the flip-flop 61 are held high by $+V$, LEN is strobed into the flip-flop 61 on the next occurring rising edge of the 20 KHz clock, thereby synchronizing LEN with the 20 KHz clock to generate the Clocked LEN signal (CLEN) as illustrated in FIG. 5. The CLEN signal is then utilized to enable the Conversion Start Line (CST) after the rising edge of the 5 KHz clock. Accordingly, the 5 KHz clock is applied to the preset input of an edge triggered D flip-flop 62, the clear input of which is held high by the $+V$ supply. Thus, when the 5 KHz clock signal is low, the flip-flop 62 is held in its preset state and when the 5 KHz clock goes high, the Q outputs of the flip-flop 62 can respond to the rising edge of the clock signal applied thereto. The 40 KHz clock is applied as the clock input to the flip-flop 62. The D input to the flip-flop 62 is provided from a NAND gate 63 which is enabled by the CLEN signal. The second input to the NAND gate 63 is provided by an EXCLUSIVE OR gate 64 which receives its inputs from the 10 KHZ and 20 KHz clocks.

Accordingly, after the 5 KHz clock goes high, the 20 KHz and 10 KHz clocks are sampled by the 40 KHz clock on its rising edge. When the EXCLUSIVE OR condition (10 KHz⊕20 KHz) is true, CST is set high. When the condition is false, CST is set low. The Q output of the flip-flop 62 is applied to the latch 60 to reset the latch when CST goes high. Thus, it is appreciated that the CST signal, also designated as $V_D$, provides three functions. Firstly, CST is applied to the sample and hold circuit 29 of FIG. 1 to sample the analog signals from the synchro resolvers. Secondly, as indicated in FIG. 1, CST ($V_D$) is applied to the successive approximation register 34 to reset the analog-to-digital converter so that after the high to low transition of CST the converter will convert the output of the sample and hold circuit 29 to provide the digital word previously described. Thirdly, CST resets LEN to prevent any further conversions from occurring until requested by the next occurring ADCST signal.

It will be appreciated that the logic 26 forms a precisely defined sampling pulse $V_D$ at a precise phase relationship with respect to the 5 KHz resolver excitation voltage as illustrated in FIGS. 2 and 5.

In operation, with reference to FIG. 1, the divider 25 provides the synchronous clock signals 5 KHz, 10 KHz, 20 KHz and 40 KHz to the logic circuit 26 for providing the sampling pulse $V_D$ for sampling the output of the analog multiplexer 28 via the sample and hold circuit 29 and for resetting the successive approximation register 34. The divider 25 also provides the 100 KHz clock to the successive approximation register 34 for clocking the successive approximation process. The 5 KHz clock is applied to the resolver excitation amplifier 27 which, in turn, provides the shaped excitation signal $V_B$ to the synchro resolvers of the servoes 10, 11 and 12. The sine and cosine square wave outputs from the resolvers, as illustrated in FIG. 2, are applied as inputs to the analog multiplexer 28 for sampling by the sample and hold circuit 29. The output of the sample and hold circuit 29 is applied to the analog-to-digital converter of the system, as discussed above, for conversion to a digital word which is transferred to the microprocessor via the data bus 22.

As discussed above, FIG. 1 illustrates the present invention utilized in a microprocessor controlled flight instrument. Data generated in accordance with the invention, for example, from the synchro resolver 18, is input to the microprocessor and the microprocessor outputs data to the components of the instrument. The apparatus of FIG. 1 may be considered as an I/O data port of the processor communicating therewith via the data bus 22. For completeness, details of this communication will now be described.

Whenever a communication is to be effected between the microprocessor and the flight instrument, the INPUT/OUTPUT REQUEST line ($\overline{IORQ}$) is enabled. When the microprocessor is to output data to the instrument, the WRITE line ($\overline{WR}$) is enabled and when data is to be transmitted from the instrument to the microprocessor, the READ line ($\overline{RD}$) is enabled. For a particular input or output request, the microprocessor provides, via the address bus 24, the address of the desired I/O device and activates $\overline{RD}$ or $\overline{WR}$ as appropriate as well as $\overline{IORQ}$. These signals provide the discrete control signals for appropriately controlling the components illustrated in FIG. 1.

When it is desired, for example, to input the sine signal from the synchro resolver 18 into the processor, the processor executes a series of instructions that control the inputs to decode circuit 23. These inputs provide control signals to enable the successive approximation register 34, the buffer 35, and to initially disable the buffer 36. Control signals are also generated to disable the latch 30 and to control the analog multiplexer 28 to select the sine winding of the resolver 18. The A/D conversion is accomplished as follows. The processor issues an instruction causing the decode circuit 23 to provide the A/D conversion start pulse (ADCST) to the logic circuit 26 to initiate the conversion procedure. The ADCST pulse is illustrated in FIG. 5 as previously discussed.

The logic 26 in response to ADCST provides the CST pulse $V_D$ in synchronism with the resolver excitation signal $V_B$ as discussed above and illustrated in FIGS. 2 and 5. The $V_D$ pulse samples the output square wave from the sine winding of the resolver 18 and thereafter controls the successive approximation register 34 to initiate the above described successive approximation process. After the process is completed, the processor, via decode circuit 23, enables the buffer 36 to transfer the resulting digital word in the register 34 to the data bus 22 for transmission to the processor.

When it is desired to output data from the processor to the components of the instrument illustrated in FIG. 1, the I/O REQUEST line and the WRITE line to the decode circuit 23 are enabled. If it is desired, for example, for the processor to output an error signal to the servo amplifier 16, the decode circuit 23 provides control signals to enable the latch 30 and to provide control signals to the analog multiplexer 21 to select the servo amplifier 16 as its output. The decode circuit 23 also disables the successive approximation register 34 and the buffers 35 and 36. With this configuration the digital error signal is applied by the processor via the data bus 22 for storage in the latch 30. The digital-to-analog converter 31 converts the digital error signal to an analog signal which is applied to the servo amplifier 16 via the amplifier 32 and the analog multiplexer 21.

Although the present invention has been described above in the situs of an HSI flight instrument, it is appreciated that the invention may find utility wherever the output of a synchro device requires demodulation. For example, in synchro controllers where the demodulated output of a synchro device provides a servo error signal, the invention may be utilized to advantage in eliminating the demodulators otherwise required. The invention was explained in terms of a synchro resolver utilized as an angular position sensor. It is appreciated that the invention is applicable to synchro devices other than resolvers to eliminate the synchro device output demodulators that are conventionally required in prior art configurations and it is further appreciated that the invention is not limited to a particular type of resolver. Additionally, although the above described embodiment illustrated the excitation signal being applied to the synchro device stator and the output provided by the rotor thereof, it is appreciated that the converse arrangement is also applicable in practicing the invention.

The invention was described in terms of the shaped resolver excitation as discussed above with respect to FIGS. 2 and 3. It is appreciated that although the rounding of the square wave excitation corners is desirable in efficaciously practicing the invention, such shaping may not be necessary in circumstances wherein the synchro output square wave is not subject to excessive ringing and a reliable sample may be taken. It is furthermore appreciated that a high frequency square wave excitation such as the 5 KHz clock signal, is utilized to minimize delays between samples of the analog signals in the sampled data system illustrated. The present invention was described in terms of sampling the square wave output of the resolver 18, utilizing the sample and hold circuit 29. It is appreciated that in prior art arrangements in which the resolver output is demodulated by a demodulator, a sample and hold circuit is often otherwise required for providing samples of the demodulated output voltages that may be varying too rapidly to permit analog-to-digital conversion without the sample and hold provision.

It is appreciated from the foregoing that the square wave excitation applied to the synchro device is modulated in amplitude by the angular position of the rotor providing a modulated square wave synchro output signal.

It is thus appreciated that by applying the square wave excitation to the synchro device and sampling the outputs thereof in synchronism with the synchro device excitation, phase sensitive demodulation of the synchro device output is achieved without the necessity of utilizing the synchronous demodulators normally required in the prior art.

While the invention has been described in its preferred embodiment, it is to be understood that the words which have been used are words of description rather than limitation and that changes may be made within the purview of the appended claims without departing from the true scope and spirit of the invention in its broader aspects.

We claim:

1. Apparatus for use with a synchro device having excitation input winding means and output winding means for providing a demodulated synchro output signal, comprising
    excitation means for providing a square wave excitation signal to said excitation input winding means, said square wave excitation signal being coupled from said excitation input winding means to said output winding means for providing a square wave output signal thereat, and
    sampling means for sampling said square wave output signal at a predetermined time phase of said square wave excitation signal thereby providing a sampled square wave output signal,
    said sampled square wave output signal providing said demodulated synchro output signal.

2. The apparatus of claim 1 in which said synchro device comprises a synchro resolver having rotor winding means and stator winding means, said input winding means being one of said rotor and stator winding means and said output winding means being the other of said rotor and stator winding means.

3. The apparatus of claim 2 in which said synchro resolver is utilized to sense angular displacement of a member, said rotor winding means being coupled to said member.

4. The apparatus of claim 2 in which said rotor winding means and said stator winding means comprise said output winding means and said input winding means respectively.

5. The apparatus of claim 1 further including analog-to-digital conversion means responsive to said sampled square wave output signal for converting said sampled square wave output signal into an equivalent digital word.

6. The apparatus of claim 1 in which said excitation means includes a synchro excitation circuit for rounding the corners of the leading edges of said square wave excitation signal to minimize ringing on said square wave output signal.

7. The apparatus of claim 6 in which said synchro excitation circuit includes level shifting means for shifting the d.c. level of said square wave excitation signal to provide said square wave excitation signal with a zero d.c. component.

8. The apparatus of claim 1 in which said sampling means comprises a sample and hold circuit.

9. The apparatus of claim 8 further including clocked timing logic means for providing said square wave excitation signal and a sampling pulse synchronized therewith,
    said sampling pulse being applied to said sample and hold circuit for sampling said square wave output signal at said predetermined time phase of said square wave excitation signal.

10. The apparatus of claim 3 in which said output winding means comprises a sine winding and a cosine winding for providing first and second square wave output signals with amplitudes proportional to the sine and cosine, respectively, of said angular displacement of said member,
    said first square wave output signal being in-phase or out-of-phase with said square wave excitation signal in accordance with the polarity of the sine of said angular displacement,
    said second square wave output signal being in-phase or out-of-phase with said square wave excitation signal in accordance with the polarity of the cosine of said angular displacement.

11. The apparatus of claim 10 for use in a flight instrument including said member and servo means for rotatably positioning said member, said first and second square wave output signals being utilized to provide the angular displacement feedback signal for said servo means.

12. The apparatus of claim 11 in which said sampling means comprises a sample and hold circuit, said apparatus further including clocked timing logic means for providing said square wave excitation signal and a sampling pulse synchronized therewith,
    said sampling pulse being applied to said sample and hold circuit for sampling each of said first and second square wave output signals at said predetermined time phase of said square wave excitation signal, thereby providing first and second sampled square wave output signals.

13. The apparatus of claim 12 further including analog-to-digital conversion means responsive to said first and second sampled square wave output signals for converting said first and second sampled square wave output signals into respective equivalent digital words.

14. The apparatus of claim 11 in which said excitation means includes a resolver excitation circuit for rounding the corners of the leading edges of said square wave excitation signal to minimize ringing on said first and second square wave output signals.

15. The apparatus of claim 14 in which said resolver excitation circuit includes level shifting means for shifting the d.c. level of said square wave excitation signal to provide said square wave excitation signal with a zero d.c. component.

* * * * *